Patented Apr. 8, 1930

1,754,010

UNITED STATES PATENT OFFICE

ADRIEN CAMBRON, OF TOTTENVILLE, NEW YORK, ASSIGNOR TO THE ROESSLER & HASSLACHER CHEMICAL COMPANY, OF NEW YORK, N. Y., A CORPORATION OF NEW YORK

ACCELERATOR FOR THE VULCANIZATION OF RUBBER

No Drawing.      Application filed January 20, 1926.   Serial No. 82,613.

The object of this invention is to provide a substance for aiding the vulcanization of rubber which will be cheap while at the same time powerful, rapid and nonpoisonous. A further object is to provide in this same substance a material which will retard the aging of the finished rubber.

My invention comprises an improved product formed by the condensation of aliphatic aldehydes having a plurality of C atoms with aromatic amines in the presence of an acidic catalyst and includes a process of treating rubber or similar material with this improved aldehyde amine condensation product and vulcanizing the rubber. My invention also includes the product of the process. One species of this material is claimed in an application S. N. 82,612 filed by me of even date herewith.

The condensation products of aldehydes and aromatic amines have been used in various forms for some time as accelerators in the art of vulcanizing rubber. These substances vary greatly in nature and activity due to the varying methods of formation and to the many different ratios suggested and employed between the aldehyde and amine. Most of these substances however are of an undesirable soft pitchy nature being neither hard materials nor free flowing liquids, because of this soft and sticky nature the material is extremely difficult to handle. Some of the so-called hard products are unsuitable in many cases since the ground particles agglomerate on standing. A recently suggested process is a secondary treatment of these soft materials with a further aldehyde addition after a primary condensation has been effected. I have found that such further aldehyde additions are unnecessary and a waste. In my U. S. Patent 1,562,146 of Nov. 17, 1925, I have disclosed and claimed one method of preparing improved condensation products of aldehydes and amines and one application of this process as the formation of an improved acetaldehyde-aniline condensation product.

I have now discovered a new process of preparing improved aldehyde-aromatic amine condensation products. I have found that it is possible to obtain a hard product suitable for use as an accelerator of vulcanization of rubber by condensing, for example, aniline and acetaldehyde in the presence of acid catalysts. This new product can be ground to a fine powder and will not agglomerate after grinding; it has excellent accelerating properties and greatly extends the life of the rubber article in which it is used.

In general I have found that all acidic materials will produce the accelerators of my invention. Preferably I use small amounts of an acid zinc salt, such as zinc chloride, as the catalyst or zinc chloride first to secure a primary condensation and finally a mineral acid, such as hydrochloric acid, to complete the condensation. I have also used hydrochloric acid alone but then the condensation reaction is quite violent and the mass tends to boil up due to the steam liberated by the heat of the reaction. I have secured similar results with other acids and salts of which sulphuric acid, dinitro-chlor-benzol and aluminum chloride are examples. The salts used are acidic, i. e. they give an acid reaction in water solution. It is generally conceded in the art that the presence of appreciable amounts of acids in the rubber will retard vulcanization. The accelerators prepared by my process though made with acid catalysts do not add an appreciable acidity to the rubber. First, because such small amounts of accelerator are used in proportion to the rubber and secondly, because only small amounts of acid catalysts are required in the condensation to form the accelerator. It has been proposed to prepare various rubber compounding materials such as age resistors, accelerators and conditioners from aldehydes and amines in aqueous acid solutions. In these, however, large amounts of acid are present and this not only alters the course of the reaction and produces a different type of product but also serves with the water to dissolve out certain constituents of the mix. The product of this type of high acid reaction requires neutralization with alkalies and other treatment such as water washing to render it suitable for use in rubber. My products, on the other hand are prepared from substantially anhydrous materials with no solvent and do not require neutralization. Further, I use only very small amounts of acid catalyst, less than 5% in all cases.

One preferred method of practicing my invention as stated above is to use an acid zinc salt, such as zinc chloride, and a mineral acid, such as hydrochloric acid, in succession, as catalysts in the aldehyde-amine condensation reaction wherein two moles of the aldehyde are used to each mole of the amine. I preferably first prepare a catalyst consisting of an addition product of zinc chloride and the amine by mixing these in reacting proportions. A small amount of this zinc chloride-amine product is then added to the amine to be condensed in a jacketed kettle, with thorough stirring to prevent the zinc chloride-amine from settling out. Cooling water is now circulated in the kettle jacket and the aldehyde (slight excess over the 2 molecular ratio to care for any vaporization loss) is run into the kettle; the pressure in the kettle is allowed to rise to about 10 pounds and the aldehyde addition regulated to maintain a slight pressure. The pressure drops to near zero in about 15 minutes after the aldehyde has been added. A small amount of aqueous hydrochloric acid solution is now added in a period of 10-15 minutes, with stirring continued as before. Cooling water is still being circulated. Due to the catalytic effect upon adding the acid the kettle temperature rises sharply, reaching about 80-85° C. As soon as this temperature begins to fall showing a completion of the major part of the reaction, the cooling water is shut-off and the water jacket emptied. Thus the heat of the reaction is utilized as fully as possible and serves to carry the reaction to completion. The charge is stirred for about 30 minutes longer and then blown out into pans to cool. When a single catalyst such as zinc chloride or dinitro-chlor-benzol is used the process starts with this catalyst present in the amine. In some cases I have found the reaction stubborn to start; I then heat the batch with steam and the reaction will proceed as before. Some single catalysts will require more time to complete the reaction than my double catalysts given above or again some aldehydes and amines are slower to react. Here it is necessary to keep up the final temperature with steam till tests indicate that the desired result has been attained. Simple tests of hardness or color will determine this with sufficient accuracy.

*Example I*

51.5 pounds aniline (1 mole)
50.0 pounds acetaldehyde (2 moles + slight excess)
0.22 pounds zinc chloride-aniline
0.25 pounds HCl (in 25% aqueous solution).

The materials were reacted as indicated above and gave a hard, brown product having a softening point of about 80° C. (For method of testing softening point see Allen's Commercial Organic Analysis Fourth Edition, Vol. III pages 76-77).

When used as the accelerator in the formula:

100 parts by weight smoked sheet
5 parts by weight zinc oxide
5 parts by weight sulphur
1 part by weight accelerator and cured at a temperature corresponding to that of steam at 40 pounds pressure the following results were obtained.

| Time of cure | Elongation | Load at 700% elong. | Load at break |
|---|---|---|---|
| | | lbs/in² | lbs/in² |
| 30 minutes | 9.5 | 1900 | 2820 |
| 45 minutes | 9.0 | 1700 | 3480 |
| 60 minutes | 9.0 | 2600 | 3880 |
| 75 minutes | 9.1 | 3200 | 3880 |
| 90 minutes | 9.0 | 2300 | 2701 |

*Example II*

216 grams butaldehyde
140 grams aniline
0.7 grams zinc chloride-aniline
1.1 grams HCl (in 25% aqueous solution)

The zinc chloride-aniline was first added to the aniline, next the butaldehyde was run in and finally the acid was added. The product was a dark free flowing liquid.

When used as the accelerator in the rubber formula of Example I and this cured for 30 minutes at 40 pound steam temperature a tensile strength of 3193 lbs/in² was obtained with an elongation of 9.7.

*Example III*

181 grams xylidine
130 grams acetaldehyde
2.0 grams zinc chloride
1.5 grams HCl (in 25% aqueous solution)

These components were reacted as in the previous case. The product was a hard dark material with a softening point of about 75° C.

Tested as the accelerator in the rubber formula of Example I and this cured 30 minutes at 40 pound steam temperature it gave a tensile strength of 3686 lbs/in² with an elongation of 9.3.

*Example IV*

160 grams aniline
152 grams acetaldehyde
8 grams dinitro-chlor-benzol (1:2:4)

The dinitro-chlor-benzol was first added to the aniline and the acetaldehyde then run in. A hard product was obtained after heating at 95-100° C. for 1 hour.

When tested as the accelerator in the rubber mix of Example I and cured for 30 minutes at the temperature of 40 pound steam a tensile strength of 3090 lbs/in² was obtained with an elongation of 10.

Example V 250 grams crotonaldehyde
165 grams aniline
0.8 grams zinc chloride aniline
1.6 grams HCl (in 25% aqueous solution)

These components were reacted as in II and heated for 1 hour at 95° C., this resulted in a hard product.

When used as the accelerator in the rubber formula of Example I and cured for 30 minutes at the temperature of 40 pound steam a tensile of 3580 lbs/in² and an elongation of 9.6 was obtained.

Example VI 400 grams aniline
380 grams acetaldehyde
6 grams zinc chloride

The zinc chloride was first added to the aniline and the acetaldehyde then run in; the reaction mixture was then heated at about 80° C. for 15 minutes. A hard product resulted which was tested as the accelerator in the rubber formula of Example I and cured for 30 minutes at the temperature of 40 pound steam a tensile of 3304 lbs/in² and an elongation of 9.3 resulted.

I have found that the products prepared as above not only are good accelerators of the vulcanization of rubber but they also impart to the rubber very excellent aging properties. The present theory in the art is that the aging of rubber in use is largely due to an oxidizing action of the air on the rubber. From this standpoint those substances which tend to preserve the rubber, that is, improve its aging qualities have been designated as "anti-oxidants".

The excellent aging properties of a rubber prepared with my material are shown by the following tests made on a rubber prepared as in Example I. This rubber was first artificially aged by placing in a chamber heated to 70° C. and passing warm fresh air over the rubber. A sample was tested at the end of each day.

| Days aged | Load at break |
|---|---|
| 0 | 3266 lbs/in² |
| 1 | 3392 lbs/in² |
| 2 | 3303 lbs/in² |
| 3 | 3341 lbs/in² |
| 4 | 3135 lbs/in² |
| 5 | 3155 lbs/in² |
| 6 | 3398 lbs/in² |
| 7 | 3449 lbs/in² |

Samples of rubber for Example I were subjected to the oxygen bomb test. This consisted in treating the specimens at 60° C., with oxygen at 300 pounds per square inch pressure. The results were as follows:—

| Hours in the bomb | Load at break |
|---|---|
| 0 | 3325 lbs/in² |
| 48 | 3125 lbs/in² |
| 72 | 2625 lbs/in² |

This shows excellent aging properties since it has been shown that 10 hours in a bomb under the above conditions is approximately equivalent to one year of natural aging (Bierer and Davis Ind. Eng. Chem. Aug. 1925).

The age resisting qualities are further brought out in a second "bomb" test. The rubber for this test was prepared from:

| | |
|---|---|
| Smoked sheet | 100 parts by weight |
| Zinc oxide | 5 parts by weight |
| Sulphur | 5 parts by weight |
| Accelerator - anti-oxidant of Ex. I | 3 parts by weight |

Cured at temperature of steam at 40 lbs/in² for 30 minutes. Specimens of this rubber were then aged in a bomb at 60° C. in an atmosphere of oxygen at 300 lbs/in² pressure and the following results obtained:

| Hours in the bomb | Load at break |
|---|---|
| 0 | 3100 lbs/in² |
| 48 | 3100 lbs/in² |
| 72 | 3150 lbs/in² |

The age resisting qualities of this rubber has been increased by a slight increase in the amount of accelerator-anti-oxidant.

The materials cited above as catalysts namely $ZnCl_2$, $HCl$, $H_2SO_4$, $\phi(NO_2)_2Cl$, $AlCl_3$ are not by any means the only materials which give excellent results according to the procedure described, but are given as examples of the wide diversity of acidic materials which when used in the proportions specified in aldehyde amine condensation reactions and in the substantial absense of water, catalyze the formation of accelerators which are also antioxidants. I therefore wish the term "acidic catalyst" to be construed broadly in the appended claims.

Whether the catalytic effect shown in my experiments is due to the acidic substances per se, or, to the addition products of these acidic substances with the amines is immaterial as influencing the scope of this invention. Nor do I wish to be limited to any exact proportions of catalyst or reacting components given above. The use of the acidic catalysts in preparing resin type accelerators admits of the widest application.

What I claim is:—

1. A process for treating rubber or similar material which comprises combining with an unvulcanized rubber compound a vulcanizing agent and the product obtained by reacting in the presence of a small amount of zinc chloride and a small amount of hydrochloric acid, one mole of aniline and two moles of crotonaldehyde.

2. A process for treating rubber or similar material which comprises combining with an unvulcanized rubber compound of vulcanizing agent and the product obtained by reacting in the presence of a small amount of zinc chloride, one mole aniline and two moles crotonaldehyde, and vulcanizing.

3. A vulcanized rubber derived from unvulcanized rubber or similar material by combining it with a vulcanizing agent and the product obtained by reacting in the presence of a small amount of zinc chloride and a small amount of hydrochloric acid, one mole of aniline and two moles of crotonaldehyde.

4. A vulcanized rubber derived from unvulcanized rubber or similar material by combining it with a vulcanizing agent and the product obtained by reacting in the presence of a small amount of zinc chloride, one mole aniline and two moles crotonaldehyde.

5. A process for treating rubber or similar material, which consists in combining an unvulcanized rubber, a vulcanizing agent, and the product obtained by reacting, under essentially anhydrous conditions and in the presence of a small amount of acidic material, a primary aromatic mono-amine containing not more than two methyl groups attached to the benzene nucleus, and an aldehyde from the group comprising crotonaldehyde and the saturated aliphatic aldehydes containing two to four carbon atoms inclusive.

6. As a new article of manufacture, a vulcanized rubber derived by combining an unvulcanized rubber, a vulcanizing agent, and the product obtained by reacting, under essentially anhydrous conditions and in the presence of a small amount of acidic material, a primary aromatic mono-amine containing not more than two methyl groups attached to the benzene nucleus, and an aldehyde from the group comprising crotonaldehyde and the saturated aliphatic aldehydes containing two to four carbon atoms inclusive.

7. A process for treating rubber or similar material, which consists in combining an unvulcanized rubber, a vulcanizing agent, and the product obtained by reacting, under essentially anhydrous conditions and in the presence of a small amount of acidic material, a primary aromatic mono-amine from the group comprising aniline and xylidene, and an aldehyde from the group comprising crotonaldehyde, acetaldehyde, and butaldehyde.

8. As a new article of manufacture, a vulcanized rubber derived by combining an unvulcanized rubber, a vulcanizing agent, and the product obtained by reacting, under essentially anhydrous conditions and in the presence of a small amount of acidic material, a primary aromatic mono-amine from the group comprising aniline and xylidene, and an aldehyde from the group comprising crotonaldehyde, acetaldehyde, and butaldehyde.

9. A process for treating rubber or similar materials which consists in combining an unvulcanized rubber, a vulcanizing agent, and the product obtained by reacting under essentially anhydrous conditions and in the presence of a small amount of acidic material from the group comprising zinc chloride, hydrochloric acid, sulfuric acid, aluminum chloride, and dinitro-chlor-benzol, a primary aromatic mono-amine containing not more than two methyl groups attached to the benzene nucleus, and an aldehyde from the group comprising crotonaldehyde and the saturated aliphatic aldehydes containing two to four carbon atoms inclusive.

10. As a new article of manufacture, a vulcanized rubber derived by combining an unvulcanized rubber, a vulcanizing agent, and the product obtained by reacting, under essentially anhydrous conditions and in the presence of a small amount of acidic material from the group comprising zinc chloride, hydrochloric acid, sulfuric acid, aluminum chloride, and dinitro-chlor-benzol, a primary aromatic mono-amine containing not more than two methyl groups attached to the benzene nucleus, and an aldehyde from the group comprising crotonaldehyde and the saturated aliphatic aldehydes containing two to four carbon atoms inclusive.

11. A process for treating rubber or similar material, which consists in combining an unvulcanized rubber, a vulcanizing agent, and the product obtained by reacting, under essentially anhydrous conditions and in the presence of a small amount of acidic material from the group comprising zinc chloride, hydrochloric acid, sulfuric acid, aluminum chloride, and dinitro-chlor-benzol, a primary aromatic mono-amine from the group comprising aniline and xylidene and an aldehyde from the group comprising crotonaldehyde, acetaldehyde, and butaldehyde.

12. As a new article of manufacture, a vulcanized rubber derived by combining an unvulcanized rubber, a vulcanizing agent, and the product obtained by reacting, under essentially anhydrous conditions and in the presence of a small amount of acidic material from the group comprising zinc chloride, hydrochloric acid, sulfuric acid, aluminum chloride, and dinitro-chlor-benzol, a primary aromatic mono-amine from the group comprising aniline and xylidene and an aldehyde from the group comprising crotonaldehyde, acetaldehyde, and butaldehyde.

13. A process for treating rubber or similar material, which consists in combining 100 parts of an unvulcanized rubber, a vulcanizing agent, and between 1 to 3 parts of the product obtained by reacting, under essentially anhydrous conditions and in the presence of a small amount of acidic material, a primary aromatic mono-amine containing not more than two methyl groups attached to the benzene nucleus, and an aldehyde from the group comprising crotonaldehyde and the saturated aliphatic aldehydes containing two to four carbon atoms inclusive.

14. As a new article of manufacture, a vulcanized rubber derived by combining 100 parts of an unvulcanized rubber, a vulcanizing agent, and between 1 to 3 parts of the product obtained by reacting, under essentially anhydrous conditions and in the presence of a small amount of acidic material, a primary aromatic mono-amine containing not more than two methyl groups attached to the benzene nucleus, and an aldehyde from the group comprising crotonaldehyde and the saturated aliphatic aldehydes containing two to four carbon atoms inclusive.

15. A process for treating rubber or similar material, which consists in combining an unvulcanized rubber, a vulcanizing agent, and the product obtained by reacting, under essentially anhydrous conditions and in the presence of a small amount of acidic material, approximately one mole of a primary aromatic mono-amine containing not more than two methyl groups attached to the benzene nucleus, and approximately two moles of an aldehyde from the group comprising crotonaldehyde and the saturated aliphatic aldehydes containing two to four carbon atoms inclusive.

16. As a new article of manufacture, a vulcanized rubber derived by combining an unvulcanized rubber, a vulcanizing agent, and the product obtained by reacting, under essentially anhydrous conditions and in the presence of a small amount of acidic material, approximately one mole of a primary aromatic mono-amine containing not more than two methyl groups attached to the benzene nucleus, and approximately two moles of an aldehyde from the group comprising crotonaldehyde and the saturated aliphatic aldehydes containing two to four carbon atoms inclusive.

17. A process for treating rubber or similar material, which consists in combining an unvulcanized rubber, a vulcanizing agent, and the product obtained by reacting under essentially anhydrous conditions and in the presence of not more than 5% of acidic material, a primary aromatic mono-amine containing not more than two methyl groups attached to the benzene nucleus, and an aldehyde from the group comprising crotonaldehyde and the saturated aliphatic aldehydes containing two to four carbon atoms inclusive.

18. As a new article of manufacture, a vulcanized rubber derived by combining an unvulcanized rubber, a vulcanizing agent, and the product obtained by reacting, under essentially anhydrous conditions and in the presence of not more than 5% of acidic material, a primary aromatic mono-amine containing not more than two methyl groups attached to the benzene nucleus, and an aldehyde from the group comprising crotonaldehyde and the saturated aliphatic aldehydes containing two to four carbon atoms inclusive.

Signed at Perth Amboy in the county of Middlesex and State of New Jersey this 18 day of January A. D. 1926.

ADRIEN CAMBRON.